United States Patent
Green

(10) Patent No.: US 6,457,918 B1
(45) Date of Patent: Oct. 1, 2002

(54) MACHINING CELL WITH DEBRIS SHIELDS

(75) Inventor: Lanny Green, Grass Lake, MI (US)

(73) Assignee: Ann Arbor Machine Company, Chelsea, MI (US)

( * ) Notice: Subject to any disclaimer, the term of this patent is extended or adjusted under 35 U.S.C. 154(b) by 14 days.

(21) Appl. No.: 09/643,623

(22) Filed: Aug. 22, 2000

(51) Int. Cl.$^7$ .............................. B23C 1/04; B23Q 11/08
(52) U.S. Cl. ................................ 409/134; 29/DIG. 60; 160/11; 160/199
(58) Field of Search ................................ 409/134, 235; 29/DIG. 56, DIG. 60; 74/613, 615; 160/11, 199, 206; 451/451; 100/349; 408/710, 234

(56) References Cited

U.S. PATENT DOCUMENTS

| | | | | |
|---|---|---|---|---|
| 5,042,554 A | * | 8/1991 | Schmidt | 160/199 |
| 5,365,991 A | * | 11/1994 | Wright et al. | 409/134 |
| 5,367,754 A | * | 11/1994 | Sheehan et al. | 29/27 C |
| 5,560,415 A | * | 10/1996 | Geissler | 160/220 |
| D377,945 S | * | 2/1997 | Bornhorst, Jr. et al. | D18/57 |
| 5,816,309 A | * | 10/1998 | Paradise | 160/199 |
| 6,116,830 A | * | 9/2000 | Azema | 409/134 |
| 6,120,223 A | * | 9/2000 | Hirose et al. | 409/134 |
| 2002/0028118 A1 | * | 3/2002 | Laur et al. | 409/134 |

FOREIGN PATENT DOCUMENTS

| | | | | |
|---|---|---|---|---|
| DE | 3619341 | * | 3/1987 | 409/134 |
| FR | 2742519 A1 | * | 6/1997 | |
| JP | 2000-141161 A | * | 4/2000 | |
| JP | 2000-176783 A | * | 6/2000 | |
| SU | 0774914 | * | 10/1980 | 409/134 |

* cited by examiner

Primary Examiner—A. L. Wellington
Assistant Examiner—Erica E Cadugan
(74) Attorney, Agent, or Firm—Olson & Hierl, Ltd.

(57) ABSTRACT

A machining cell capable of providing tool movement along at least one axis is provided with at least one, but preferably a pair of articulated debris shields mounted to a tool carriage that translates along an axis of motion. Each articulated debris shield occludes space vacated by the tool carriage as it translates along the axis of motion. In a preferred embodiment, the machining cell provides tool movements along x-, y-, and z-axes and has a stationary housing that supports a z-axis carrier frame slidably mounted thereto for translation along the z-axis. An x-axis carriage is slidably mounted to the z-axis carrier frame for translation along the x-axis. A y-axis spindle frame is slidably mounted to the x-axis carrier frame for vertical translation along the y-axis. Articulated debris shields constituted by folding panels are connected to the x-axis carriage and to the z-axis carrier frame for occluding gaps between the x-axis carriage and the z-axis carrier frame as the x-axis carriage translates relative to the z-axis carrier frame.

14 Claims, 7 Drawing Sheets

US 6,457,918 B1

MACHINING CELL WITH DEBRIS SHIELDS

TECHNICAL FIELD OF THE INVENTION

This invention relates generally to machining tools and more generally to computerized numerically controlled machining cells.

BACKGROUND OF THE INVENTION

A machining cell provides accurate and relatively rapid computer-controlled movements of a machine tool relative to a workpiece. The tool is mounted in a motor-driven spindle that is translated along a predetermined axis of motion, typically along mutually orthogonal x-, y- and z-axes relative to the workpiece, to make the cut or cuts necessary to machine the workpiece to the desired shape. Controlled movements of the spindle can be effected hydraulically or electrically using appropriate electronic controls, e.g., a CNC controller. Accurate translation of the spindle along each respective axis is provided by precisely machined guide surfaces that slide relative to each other. To maintain accuracy, it is important that the electronics, hydraulics and guide surfaces remain free of contamination. During the machining process, debris such as metal chips or shavings, as well as coolant spray, are necessarily generated by the tool working against the workpiece. Such debris, especially the chips or shavings, tend to be scattered from the machine tool in various directions, with the consequent risk that some of the chips or shavings might contaminate the nearby electronics, hydraulics or guide surfaces of the machining cell. Alleviating the risk of such contamination is a desirable goal.

SUMMARY OF THE INVENTION

A machining cell capable of providing tool movement along at least one axis of motion includes a stationary base, a tool carriage slidably mounted to the base for translation along an axis of motion, and an articulated debris shield on at least one side, and preferably on each side, of the tool carriage. Both articulated debris shields are connected to the respective sides of the tool carriage and occlude space vacated by the tool carriage as the tool carriage translates along its axis of motion. Each articulated debris shield is made up of hinged panels that fold and unfold as the tool carriage translates.

A preferred embodiment of the present invention involves a machining cell that provides tool movements in several predetermined directions, for example, along mutually orthogonal x-, y-, and z-axes. In a particularly preferred embodiment, a stationary bed has a z-axis carrier frame slidably mounted thereto for translation along the z-axis. An x-axis carriage is slidably mounted to the z-axis carrier frame for translation along the x-axis. A y-axis spindle frame or headstock can be slidably mounted to the x-axis carrier frame for vertical translation along the y-axis, if desired. A pair of articulated, upstanding debris shields is mounted to the z-axis carrier frame and is connected to the x-axis carriage for occluding gaps between the x-axis carriage and the z-axis carrier frame. The gaps vary in width as the x-axis carriage translates along the x-axis relative to the z-axis carrier frame, and the articulated debris shields fold and unfold as needed to occlude the gaps.

The machining cell, in turn, can be enveloped by a slidable cage, preferably with transparent side panels, that provides a further guard function for the machining cell.

An advantage of the present invention is that the risk of debris such as metal chips or shavings passing through the gap to contaminate other components of the machining cell is alleviated. Other advantages of the invention will be apparent from the following description of preferred embodiments made with reference to the drawings.

DESCRIPTION OF THE PREFERRED EMBODIMENT

Figure 1:
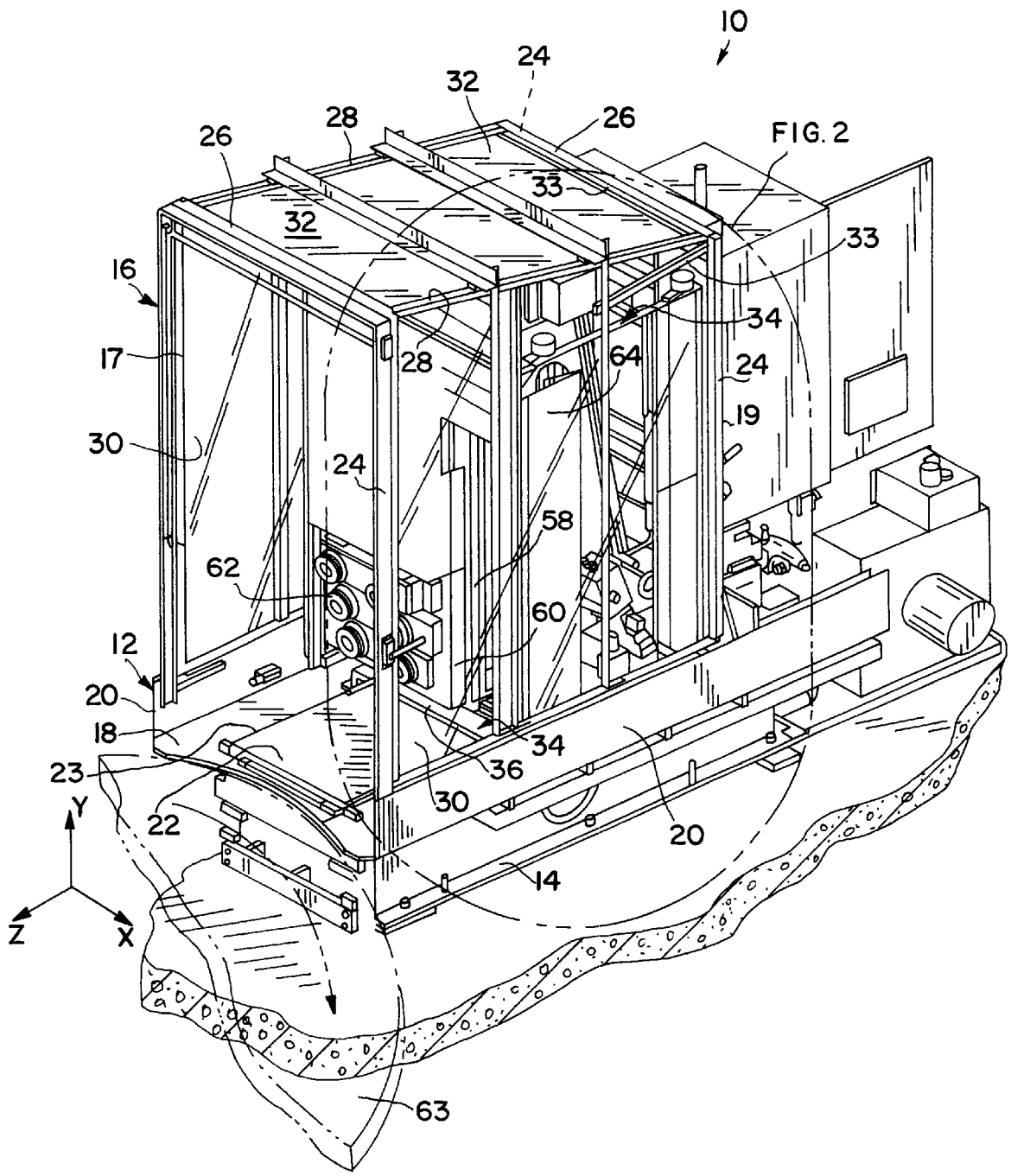
FIG. 1 is a perspective view of a machining cell configured in accordance with the present invention.
Figure 2:
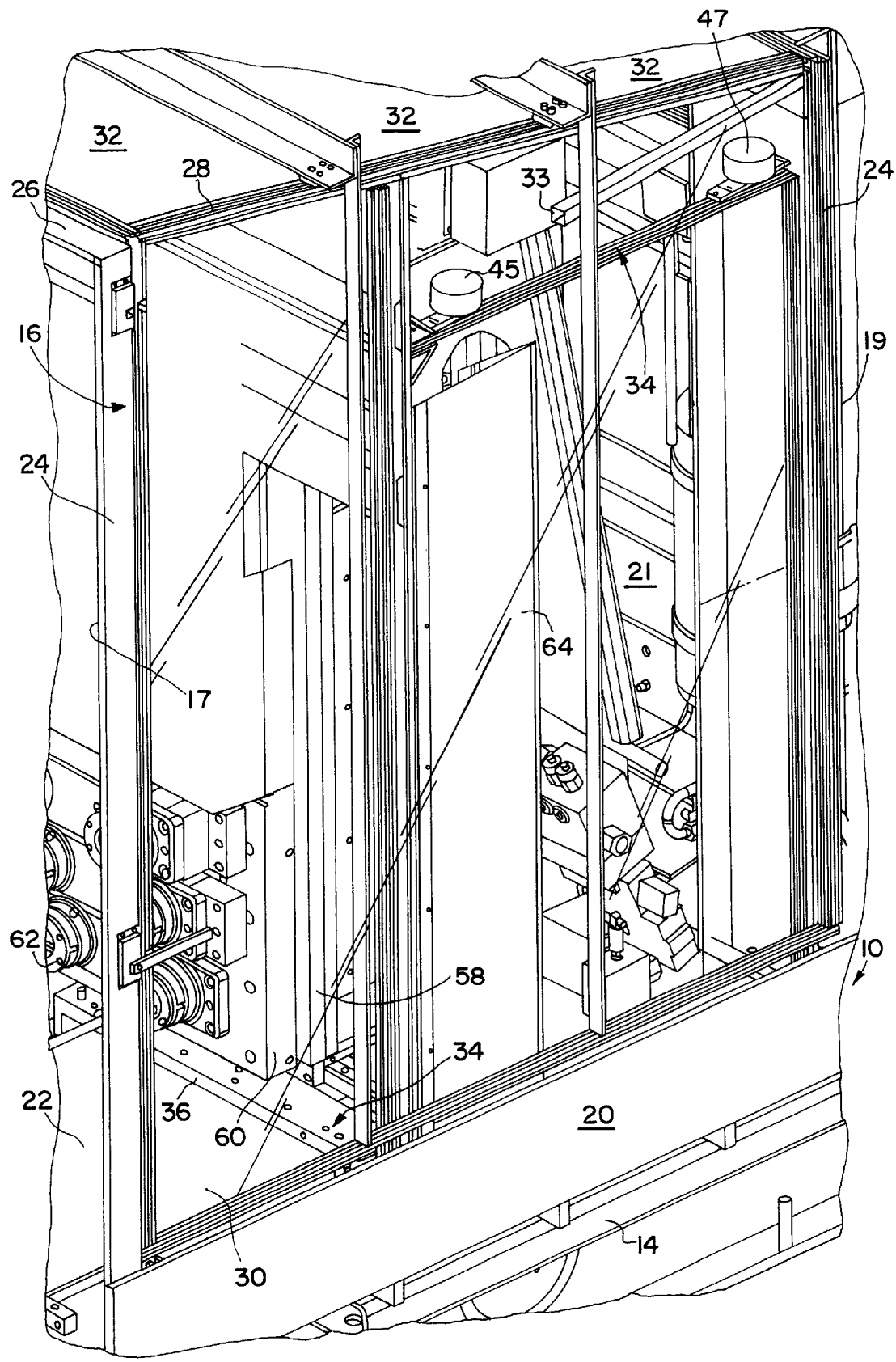
FIG. 2 is an enlarged perspective view of a portion of the machining cell of FIG. 1.

Referring to FIGS. 1 and 2, a machining cell 10 is illustrated oriented relative to mutually orthogonal axes x, y and z, wherein the x- and z-axes are oriented horizontally while an optional y-axis is oriented vertically. One or more such machining cells can be positioned adjacent a given workpiece to perform machining operations thereon. As used herein, the term "longitudinal" refers to an orientation substantially parallel to the z-axis, and the term "transverse" refers to an orientation substantially parallel to the x-axis. Certain components of machining cell 10 translate along respective ones of the x-, y- and z-axes, as described further below.

Machining cell 10 includes a stationary bed 12 with a machine base 14, and an enclosure frame or cage 16 movably mounted thereon for movement along the z-axis. In particular, cage 16 can ride on rails 25 (FIG. 7) and the like provided in upstanding skirts 20 that extend from floor 18 of machine base 14.

Z-axis base plate 22 is fixed to machine floor 18, and thus to base 14. Guide edges 23 of base plate 22 are parallel to the z-axis.

Figure 7:
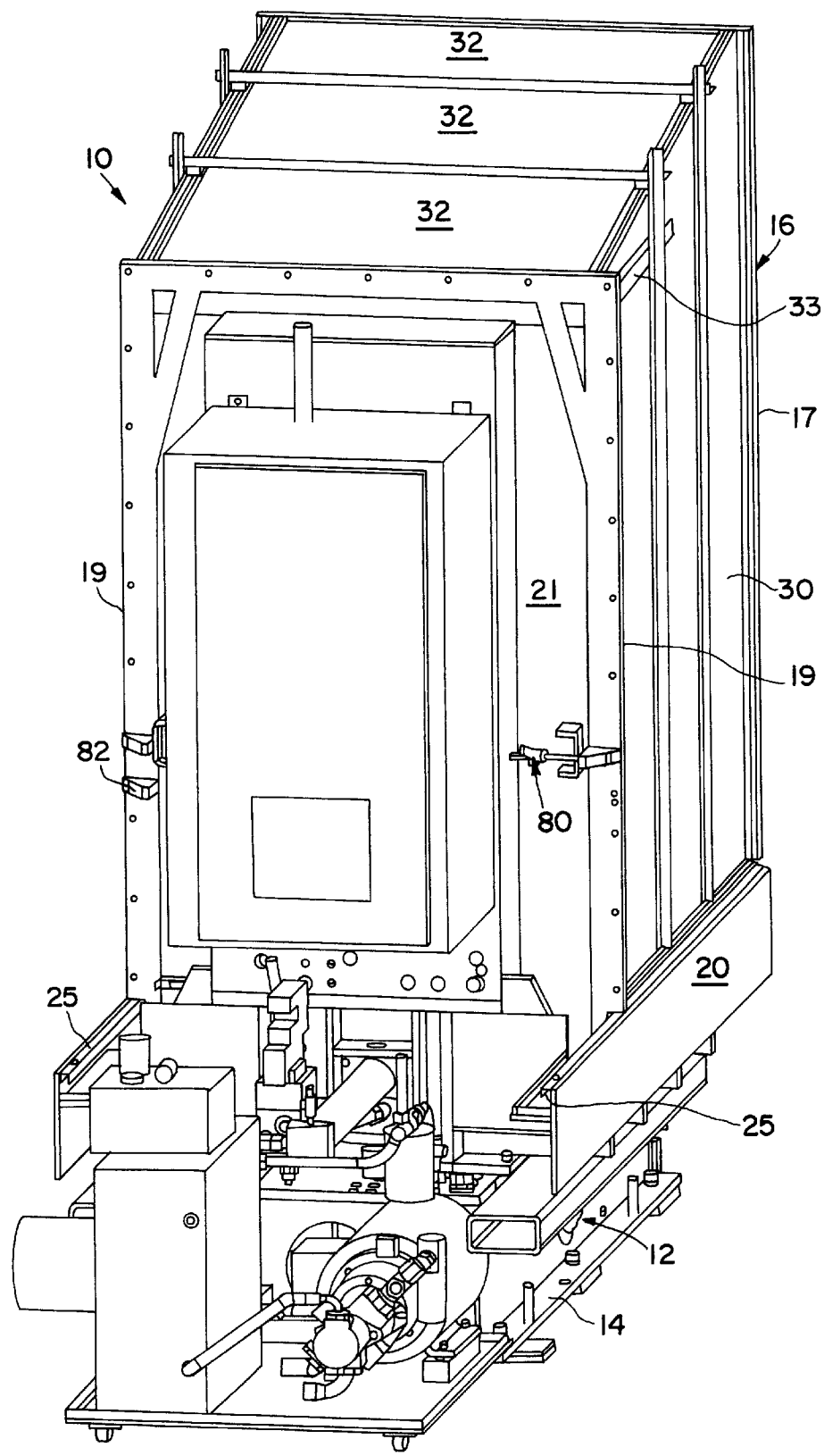
FIG. 7 is a rear perspective view of the machining cell of FIG. 1.

Case 16 has an open front end 17 and a rear end 19 occluded by upstanding rear bulkhead 21 (FIG. 7). Cage 16 includes four upright corner members 24 connected by transverse top members 26 and longitudinal top members 28, all arranged to form box-like cage 16. Side panels 30, at least one preferably transparent, are provided for cage 16, as well as a top panel 32. A suitable material of construction for transparent panels is a polycarbonate resin, e.g., a polycarbonate resin commercially available under the designation LEXAN. In this manner, cage 16 provides protection from, as well as opportunity for visual inspection of, the working parts of machining cell 10. To gain access to the working parts for maintenance and/or repair, cage 16 can be shifted to one side along the aforementioned rails 25 or the like. Top panel 32 can also be transparent, if desired, and preferably slopes rearwardly so as to drain toward the rear any condensate that may accumulate on the underside thereof during operation of the machining cell. A gutter 33 can be provided within cage 16 in proximity of top panel 32 to drain away any collected condensate from the rearward most edge of top panel 32 and guide any such condensate back onto bed 12 even when the cage is retracted.

As shown in FIGS. 3–6, disposed on bed 12 and particularly within cage 16 is a z-axis carrier frame 34 that is mounted for translation along the z-axis. Z-axis carrier frame 34 includes a base member 36 mounted in sliding engagement with z-axis base plate 22 and is constrained by the guide edges 23 thereof to translate along the z-axis. Base member 36 supports a frame 38 which includes upright leading edge corner members 40, upright trailing edge corner members 41, longitudinal top members 42, and transverse top members 44, all arranged and connected to form a box-like unit. Z-axis carrier frame 34 also supports an x-axis base plate 46 having guide edges parallel to the x-axis. Base member 36, frame 38 and x-axis base plate 46 translate as a unit along the z-axis. Rollers 45 and 47 at upper corners of z-axis carrier frame 34 abut the inside surface of side panels 30 and facilitate a sliding movement of these panels to provide access for maintenance purposes and the like. At the same time the stiffness of frame 34 contributes to the stability of the entire outer guard structure.

Again referring to FIGS. 3–6, further disposed within cage 16 on bed 12 is an x-axis carriage 48 supported by z-axis carrier frame 34. More particularly, x-axis carriage 48 is mounted in sliding engagement with x-axis base plate 46 and is constrained by the guide edges thereof to translate along the x-axis. In the embodiment shown, x-axis carriage 48 supports a hydraulic cylinder 50 fixed thereto having a rod 52 fixed to z-axis carrier frame 34. Cylinder 50 and rod 52 are actuated by hydraulic control valve 54 to effect translation of x-axis carriage 48 along the x-axis relative to z-axis carrier frame 34. Control valve 54 communicates with other hydraulic control and pump apparatus, not shown. Other arrangement of parts can be made as well.

X-axis carriage 48 further includes a front edge 56 which (referring now to FIGS. 1 and 2) supports a vertical guide 58 having guide edges parallel to the y-axis. A y-axis spindle frame 60 is mounted in sliding engagement with vertical guide 58 and is constrained by the guide edges thereof to translate vertically along the y-axis. Spindle frame 60, in turn, supports one or more spindles 62 which carry machine tools.

Before considering additional structural features of the preferred embodiment, the relative movements of the elements described heretofore shall be summarized briefly. The spindle 62, carrying a machine tool, can translate along each of three mutually orthogonal axes, x, y and z, to effect a machining operation on a workpiece (not shown) positioned on indexing turret 63. Vertical translation along the y-axis is effected by vertical translation of spindle frame 60, which carries spindle 62, relative to vertical guide 58 and hence to x-axis carriage 48. Horizontal translation along the x-axis is effected by transverse translation of x-axis carriage 48 relative to z-axis carrier frame 34. Horizontal translation along the z-axis is effected by longitudinal translation of z-axis carrier frame 34 relative to stationary housing 12. Plural spindles 62 in a high speed machining cell carried by the same spindle frame result in considerable time savings as compared to an automatic tool changer.

Figure 3:
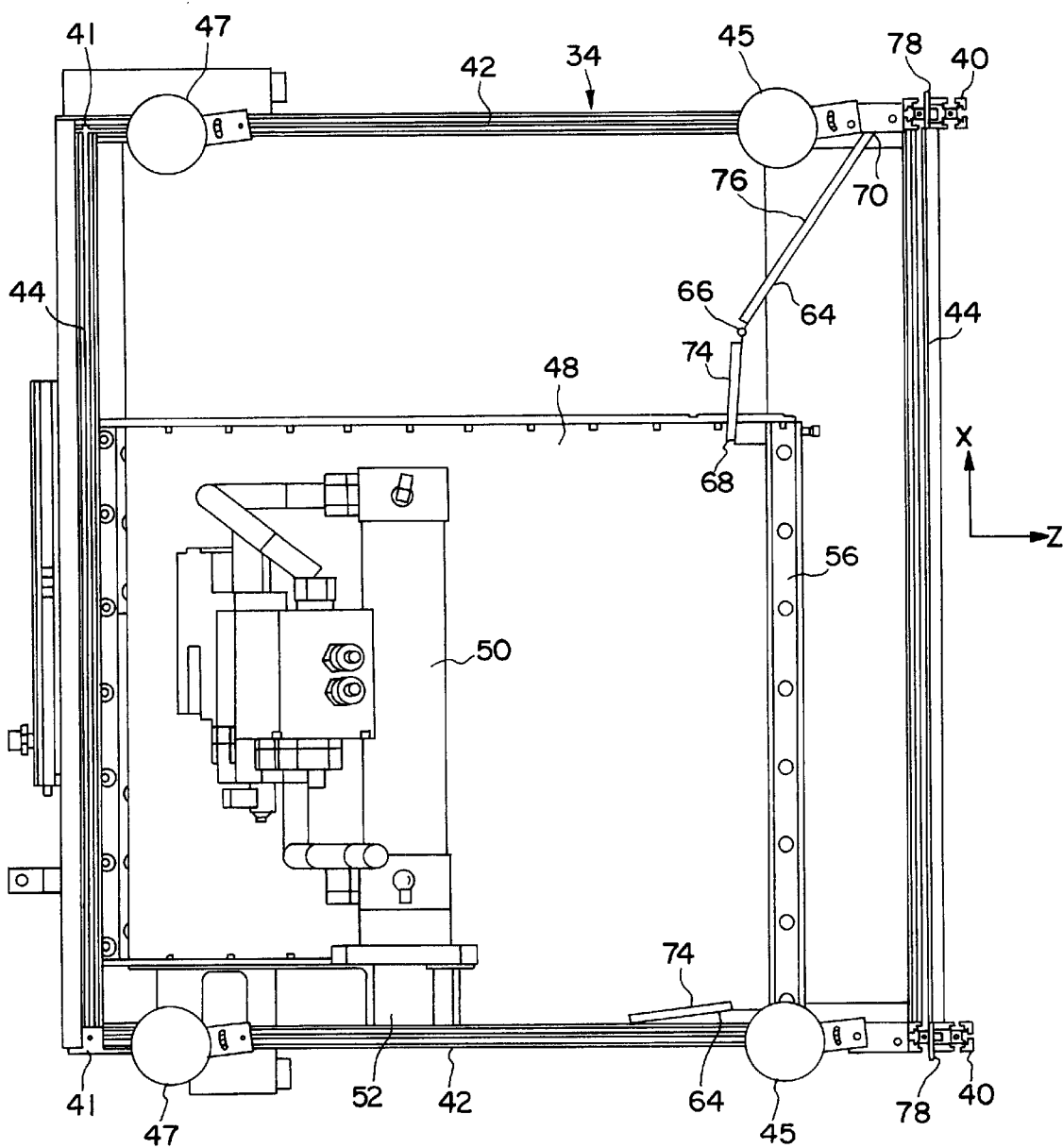
FIG. 3 is a plan view of a z-axis carrier frame and x-axis carriage of the machining cell of FIG. 1.

Connected to x-axis carriage 48 and z-axis carrier frame 34 are a pair of articulated debris shields 64. Each debris shield 64 includes a set of articulated panels 74 and 76, preferably rigid and joined at and articulated about a vertical hinge line 66 located intermediate inside edge 68 and outside edge 70 of shield 64. As shown in FIG. 3, panels 74 and 76 are of unequal width. The width of these panels can be selected as required for a particular machining cell, however. With respect to general configuration, articulated debris shield 64 is similar to a bi-fold door of the type often used as a closet door. Inside edge 68 of shield 64 is pivotally connected by a hinge to x-axis carriage 48, and outside edge 70 is pivotally mounted by a hinge, directly or indirectly, to z-axis carrier frame 34 for pivoting about a vertical axis. Consequently, as x-axis carriage 48 translates transversely relative to z-axis carrier frame 34, debris shield 64 articulates about hinge line 66 with inside edge 68 pivoting relative to x-axis carriage 48 and outside edge 70 pivoting relative to z-axis carrier frame 34. As can be seen in FIG. 3, panel 74 which is connected to x-axis carriage 48 preferably is relatively narrower than panel 76 mounted to z-axis carrier frame 34.

Throughout the range of transverse translation along the x-axis, debris shield 64 serves to substantially occlude the gap between x-axis carriage 48 and z-axis carrier frame 34, which gap varies in width between a minimum and maximum horizontal distance. This serves the useful function of alleviating the risk of debris such as metal chips or shavings or coolant spray generated at the spindle 62 passing through an open gap that would otherwise exist between x-axis carriage 48 and z-axis carrier frame 34. The passage of debris into the region behind spindles 62 is undesirable because of the risk that such debris would contaminate the precision guide surfaces, hydraulics or electronics located there.

Figure 4:
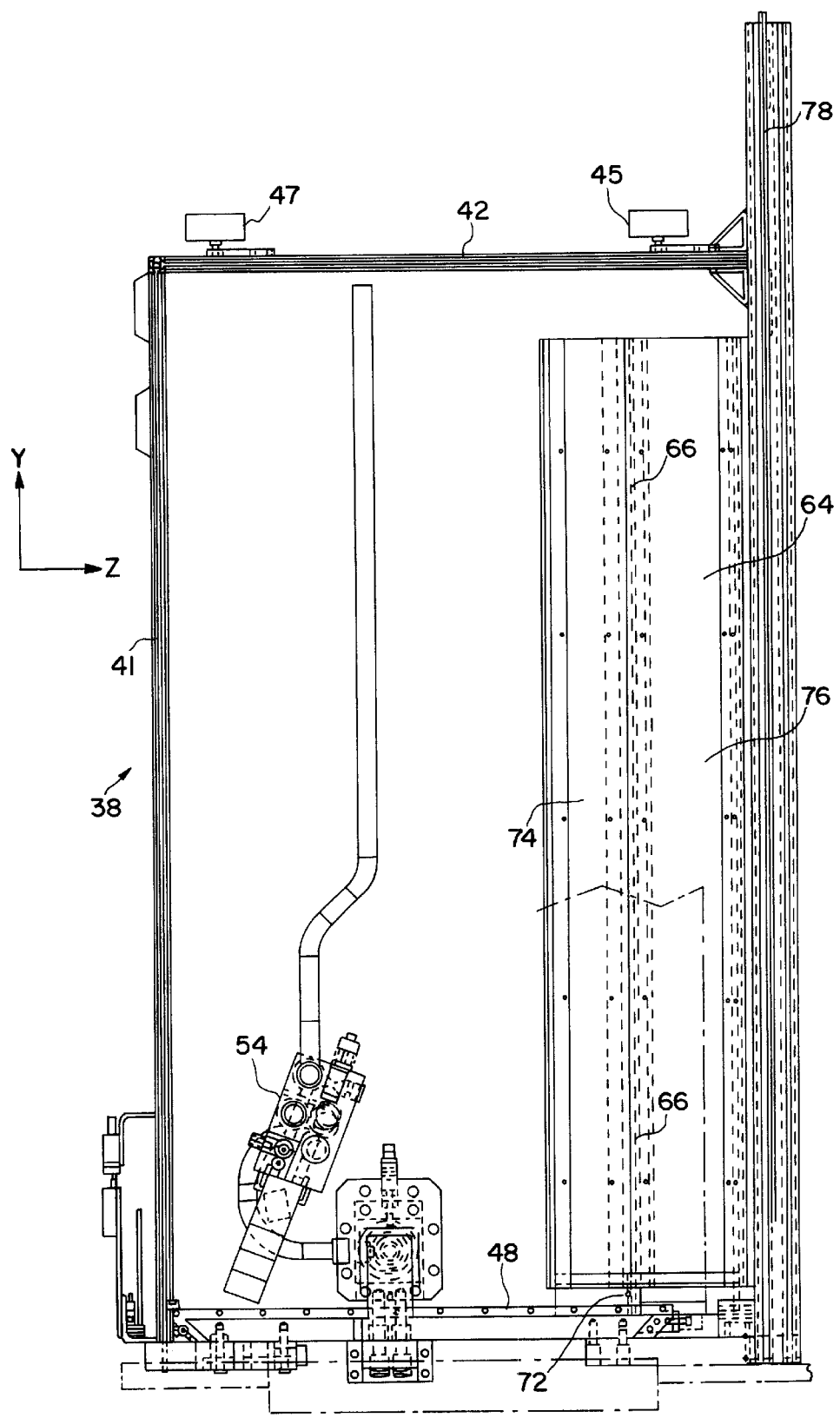
FIG. 4 is a side elevation view of the z-axis carrier frame and x-axis carriage of FIG. 3.
Figure 5:
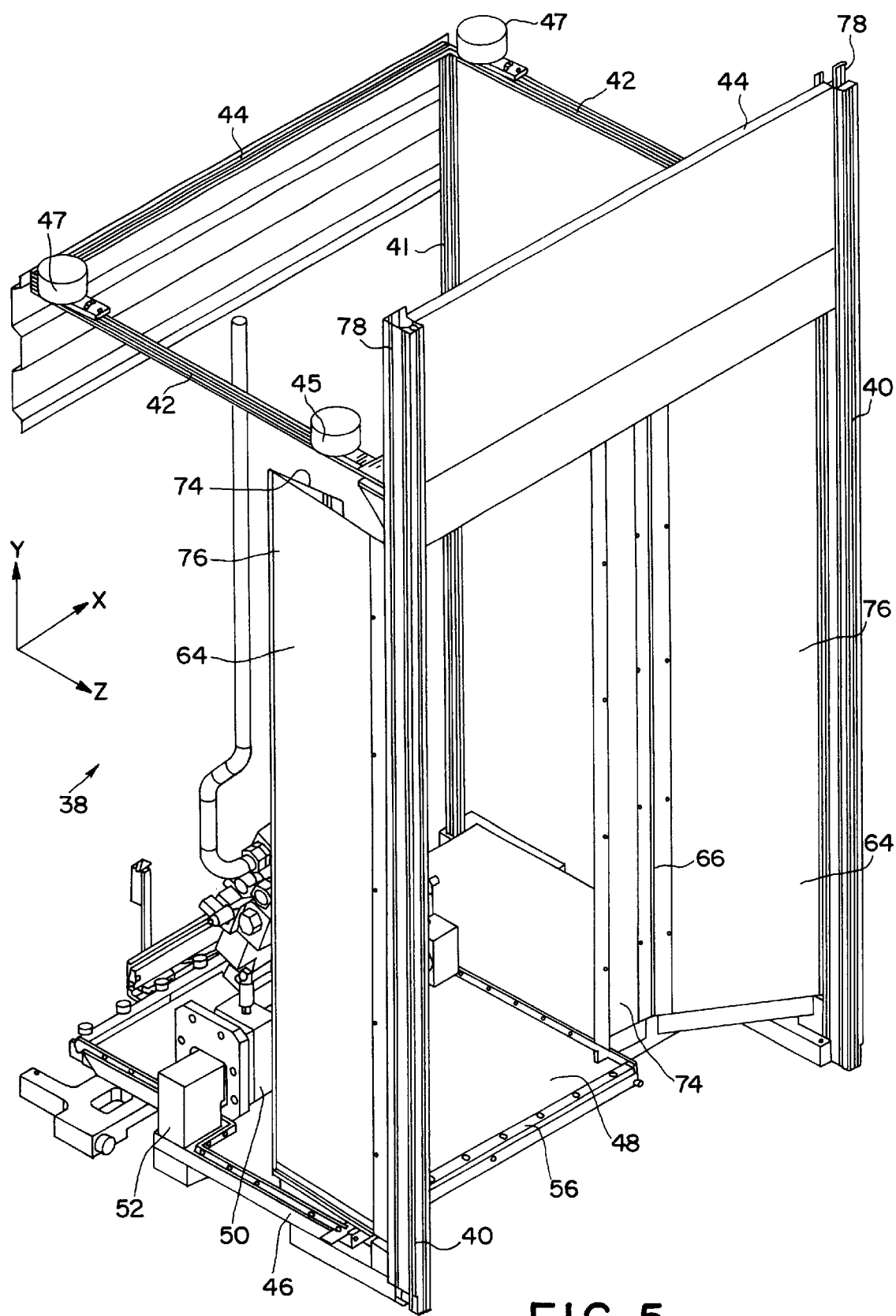
FIG. 5 is a perspective view of the z-axis carrier and x-axis carriage of FIG. 3.
Figure 6:
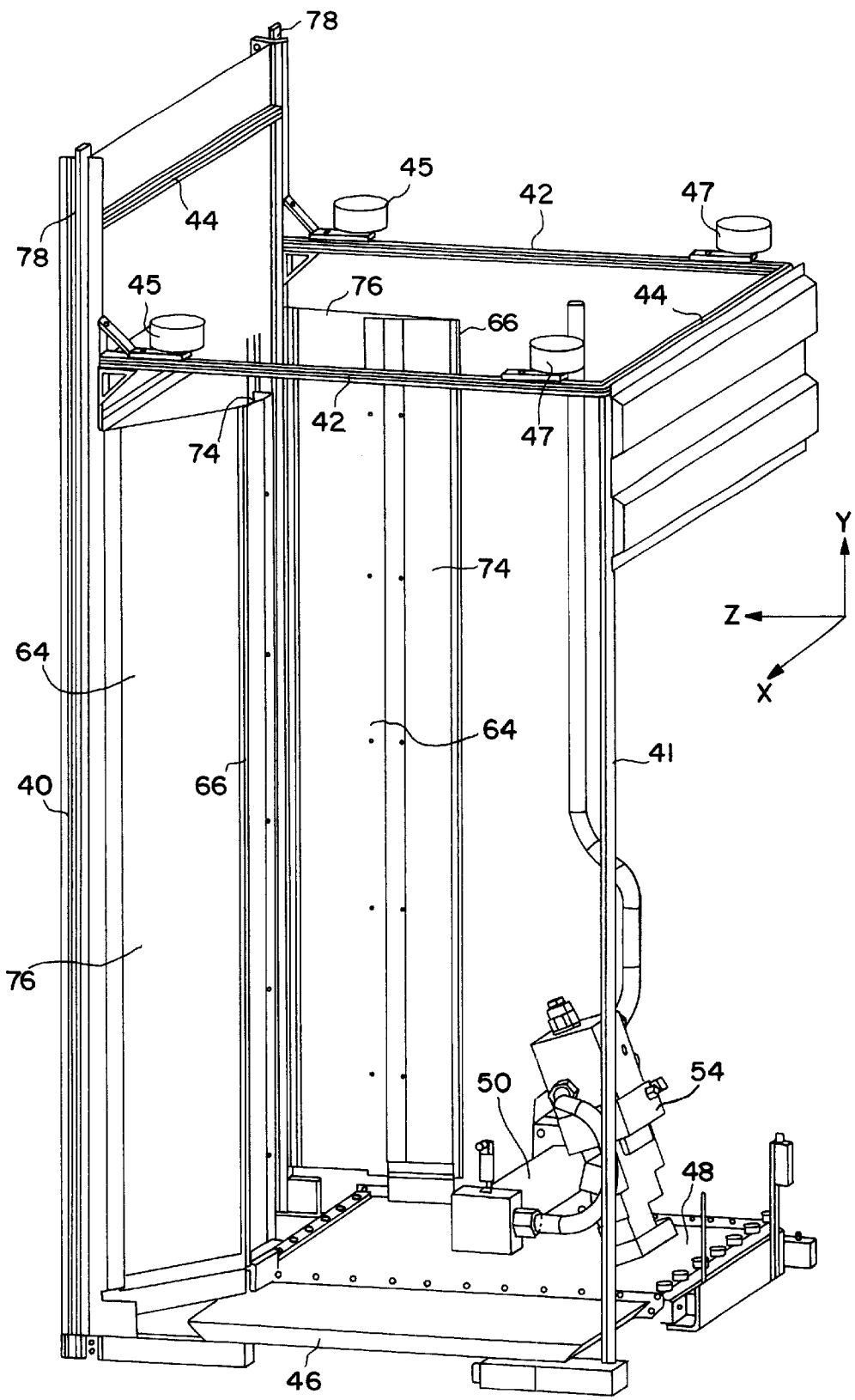
FIG. 6 is another perspective view of the z-axis carrier frame and x-axis carriage of FIG. 3.

Referring particularly to FIG. 4, a brush device 72 having generally vertically oriented, downwardly extending bristles provides a flexible closure between the adjacent articulated panels 74 and 76 of debris shield 64 at hinge line 66. Brush device 72 extends downwardly at the bottom end of debris shield 64.

Referring especially to FIGS. 3–6, a vertical flexible wiper blade 78, preferably made of an elastomeric material, extends outwardly from each of the two upright leading edge corner members 40 proximate spindle 62. Wiper blade 78 contacts the inner surface of slidably mounted, contiguous transparent side access panel 30, provides a seal between the z-axis carrier frame 34 and cage 16, and also wipes side panel 30 as z-axis carrier frame 34 translates along the z-axis. This further serves the useful purpose of continually cleaning the inner surface of side panel 30 during machining operations to remove adhering dust, oil, condensation, or other substances that would otherwise accumulate on side panel 30 and block visual inspection of the components located within enclosure frame 16.

Referring to FIG. 7, bulkhead 21 occludes the rear portion 19 of cage 16. Bulkhead 21 co-acts with cage 16 to seal the interior of the machining cell and also provides support for the necessary service connections to machining cell 10. To that end, bulkhead 21 can be provided with weatherstripping at its interface with rear portion 19. Such a seal retains coolant and mist within the machining cell, and assists in maintaining a dry floor environment. Additionally, bulkhead 21 is equipped with a securement means, such as latch assembly 80 and the like, for securing cage 16 in place during normal operation of machining cell 10. For safety purposes, cage 16 can be provided with a gate switch 82, preferably with a key, mounted to rear portion 19 and a corresponding switch body mounted to bulkhead 21.

Although the present invention has been described with particularity with respect to a preferred embodiment thereof, no limitation of the scope of the invention is thereby intended. The subject matter which applicant regards as his invention and in which he claims an exclusive right is defined by the claims appended below.

I claim:

1. A machining cell capable of providing tool movements along predetermined axes of motion and comprising:

a stationary base;

a carrier frame slidably mounted to the base for translation along a z-axis;

an x-axis carriage slidably mounted to the z-axis carrier frame for translation along a x-axis transversely to the z-axis; and a pair of articulated, upstanding debris shields mounted to the z-axis carrier frame, each said debris shield connected to a respective side of the x-axis carriage, for occluding a gap between the x-axis carriage and the z-axis carrier frame as the x-axis carriage translates along the x-axis relative to the z-axis carrier frame; and a cage provided with substantially planar side panels and slidably mounted to the stationary base and enveloping said carrier frame and said carriage;

said carrier frame being provided with rollers that contact the inner surfaces of the side panels and partially support said cage while permitting relative motion of the carrier frame with respect to the cage.

2. The machining cell of claim 1, in which each of said pair of articulated debris shields has a set of panels joined at a hinge line, and one panel of each said set of panels is pivotally connected to the x-axis carriage.

3. The machining cell of claim 2, in which panels of each said set of panels are unequal in width.

4. The machining cell of claim 3, in which said panels pivotally connected to the x-axis carriage have a width less than that of any other panel in the corresponding set of panels.

5. The machining cell of claim 2, in which each of said pair of debris shields is pivotally mounted to the z-axis carrier frame.

6. The machining cell of claim 1, in which each of said pair of articulated debris shields terminates in a flexible member in contact with said x-axis carriage.

7. The machining cell of claim 6, which the flexible member includes a brush device.

8. The machining cell of claim 1, in which the z-axis carriage includes a wiper blade in sliding contact with at least one of the side panels and substantially co-extensive with the vertical extent of the side panel.

9. The machining cell of claim 8, in which the wiper blade is situated at the leading edge of the z-axis carrier frame.

10. A machining cell having a front portion and a rear, and providing tool movements along mutually orthogonal x-, y-, and z-axes, comprising:

a stationary base;

a z-axis carrier frame slidably mounted to the stationary base for horizontal translation along the z-axis;

an x-axis carriage slidably mounted to the z-axis carrier frame at the front portion of the machining cell for horizontal translation along the x-axis;

a y-axis spindle frame slidably mounted to the x-axis carrier frame for vertical translation along the y-axis;

a pair of articulated, upstanding debris shields mounted to the z-axis carrier frame, each said debris shield connected to a respective side of the x-axis carriage, for occluding a gap between the x-axis carriage and the z-axis carrier frame as the x-axis carriage translates along the x-axis relative to the z-axis carrier frame; and a cage with side panels slidably mounted to the base and enveloping the carrier frame, carried spindle frame wherein the cage has a rearwardly sloping top panel.

11. The machining cell of claim 10, wherein the cage has at least one transparent side panel.

12. The machining cell of claim 10, in which a transparent side panel is provided on both sides of the z-axis carrier frame.

13. The machining cell of claim 10, in which a wiper blade is mounted to the z-axis carrier frame and is positioned in sliding contact with the vertical extent of a contiguous side panel of the cage.

14. The machining cell of claim 13, in which the wiper blade is elastomeric.

* * * * *

UNITED STATES PATENT AND TRADEMARK OFFICE
CERTIFICATE OF CORRECTION

PATENT NO.    : 6,457,918 B1
DATED         : October 1, 2002
INVENTOR(S)   : Lanny Green It is certified that error appears in the above-identified patent and that said Letters Patent is hereby corrected as shown below:

Column 6,
Line 28, "carried spindle" should be -- carriage and spindle --.

Signed and Sealed this

Eighth Day of July, 2003

JAMES E. ROGAN
*Director of the United States Patent and Trademark Office*